United States Patent [19]

Fox

[11] Patent Number: 4,915,148
[45] Date of Patent: Apr. 10, 1990

[54] JOINTER ATTACHMENT FOR MULTIPURPOSE POWER TOOL

[75] Inventor: Anthony Fox, Bloomington, Minn.

[73] Assignee: TFC Corporation, Bloomington, Minn.

[21] Appl. No.: 315,931

[22] Filed: Feb. 27, 1989

[51] Int. Cl.$^4$ ............................................. B21C 9/02
[52] U.S. Cl. .................... 144/1 C; 29/27 A; 144/1 R; 144/117 R; 144/129; 408/20
[58] Field of Search ................ 29/560, 26 A, 27 A; 408/20; 144/1 R, 1 B, 1 C, 1 H, 35 A, 129, 117 R, 287

[56] References Cited

U.S. PATENT DOCUMENTS

| | | | |
|---|---|---|---|
| 2,109,061 | 2/1938 | Dietrich | 144/129 |
| 2,619,135 | 11/1952 | Callaway | 408/20 |
| 2,623,269 | 12/1952 | Goldschmidt | 408/20 |
| 2,804,107 | 8/1957 | Taylor | 144/129 |
| 2,835,289 | 5/1958 | Rockwell | 144/117 R |
| 2,872,957 | 2/1959 | Eschenburg | 144/129 |
| 2,927,612 | 3/1960 | Edgemond, Jr. et al. | 408/20 |
| 4,456,042 | 6/1984 | Clark et al. | 144/129 |
| 4,510,980 | 4/1985 | Bartlett et al. | 144/287 |
| 4,830,069 | 5/1989 | Milyard | 144/1 B |

*Primary Examiner*—W. Donald Bray
*Attorney, Agent, or Firm*—Haugen and Nikolai

[57] ABSTRACT

A specially designed jointer is provided as an accessory attachment to a multipurpose power tool assembly described in U.S. Pat. No. 4,349,945. The jointer may be mounted on the same bench surface as the multipurpose power tool itself and a tubular coupler is used to join the power take-off shaft of the multipurpose power tool to the jointer's drive shaft such that the same drive motor used for the multipurpose power tool can also provide power to the jointer.

4 Claims, 2 Drawing Sheets

JOINTER ATTACHMENT FOR MULTIPURPOSE POWER TOOL

BACKGROUND OF THE INVENTION

I. Field of the Invention

This invention relates generally to a multipurpose shop tool which is convertible to perform a variety of wood/metal working operations and more particularly to the design of a jointer as an optional attachment for such multipurpose power tool.

II. Discussion of the Prior Art

In applicant's earlier U.S. Pat. No. 4,349,945, there is described the construction and operational features of a multipurpose power tool which can readily be converted to perform a wide variety of operations on a workpiece including drilling, shaping, routing, sanding, sawing, turning, and milling. Although the power tool assembly described in the aforereferenced patent is extremely versatile, it may not conveniently be used to create a true, flat surface on an irregular piece of lumber. Thus, it has been necessary in the past to have a separate jointer in the suite of equipment in a well furnished shop, such a jointer having its own support stand and motor.

SUMMARY OF THE INVENTION

The present invention is directed to an auxiliary attachment for the multipurpose power tool in the form of a jointer which can readily be mounted on one end of the bench supporting the multipurpose power tool and specially designed so that a coupling tube may be used to join the power take-off shaft of the multipurpose power tool to the drive shaft of the jointer. This makes it unnecessary to have a separate motor drive for the jointer while allowing both pieces of equipment to be driven simultaneously.

The foregoing features, objects and advantages of the present invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
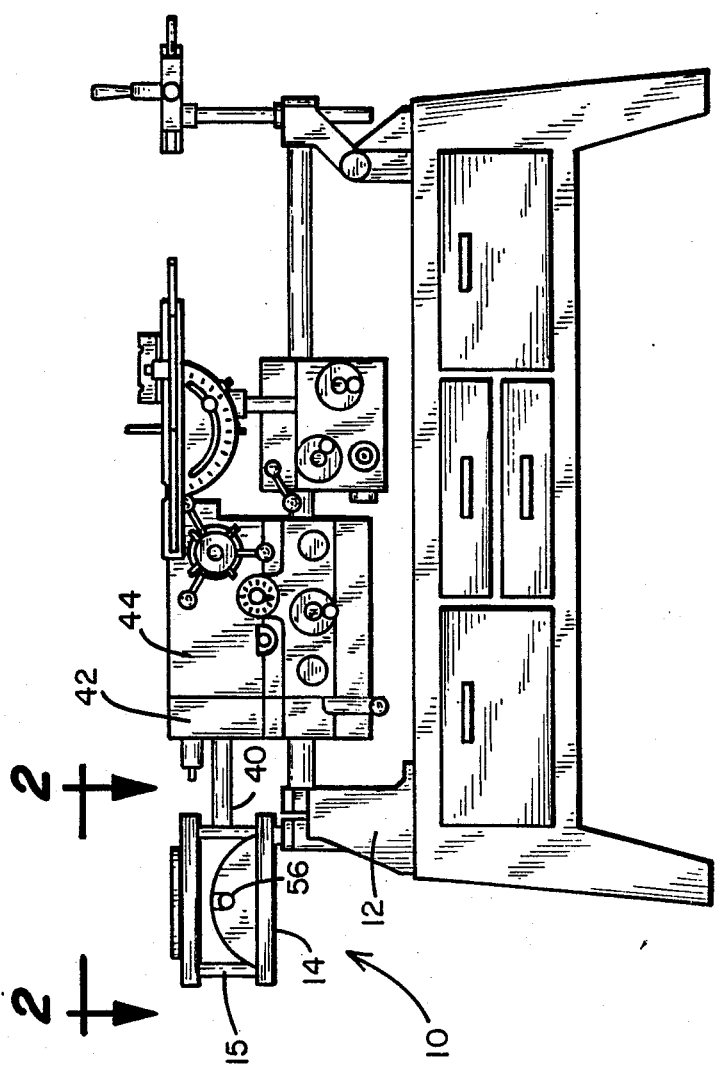
FIG. 1 is a front view showing the jointer of the present invention mounted as an optional accessory to a multipurpose power shop tool.

Referring first to FIG. 1, there is shown a front view of the multipurpose power tool of the type fully described in the aforereferenced U.S. Pat. No. 4,349,945 and incorporating the jointer attachment of the present invention. The jointer is indicated generally by numeral 10 and is affixed to a support stand 12, already a part of the multipurpose power tool assembly. Specifically, the jointer includes a base 14 having a pair of spaced-apart tubular stubs 16 and 18 (FIG. 3) projecting vertically from the undersurface of the baseplate 14. The cylindrical stubs 16 and 18 are arranged to fit within the existing vertical bores provided in the support stand 12. A knurled rod 20, having appropriately threaded ends thereon, passes between the support stand members 22 and 24 through which the vertical bores pass, and by appropriately rotating the rod 20, the jointer attachment becomes firmly locked in place on the support stand. The entire jointer attachment may be removed by loosening the knurled rod and lifting the assembly free from the stand 12.

Affixed to the base plate 14 is a stationary table segment 26 and an adjustable table segment 28. Positioned intermediate the fixed and adjustable table members is a cylindrical roller 30 supporting a cutter knife 32, the roller 30 being journaled for rotation about a horizontal axis in bearings 34 and 36. Extending from the right side of the roller 30 is a splined shaft 38. A tubular nylon coupler member 40 fits onto shaft 38. Coupler 40 has an internal, longitudinal bore having mating teeth or splines to prevent slippage between the shaft 38 and the coupler 40. Coupler 40 is configured to mate with the splined power take-off shaft within the belt transmission housing 42 secured to the power head 44 of the multipurpose power tool as shown in FIG. 1. Thus, the driving power for the cutter of the jointer is obtained from the same drive motor used to power the remaining portions of the multipurpose power tool.

Figure 2:
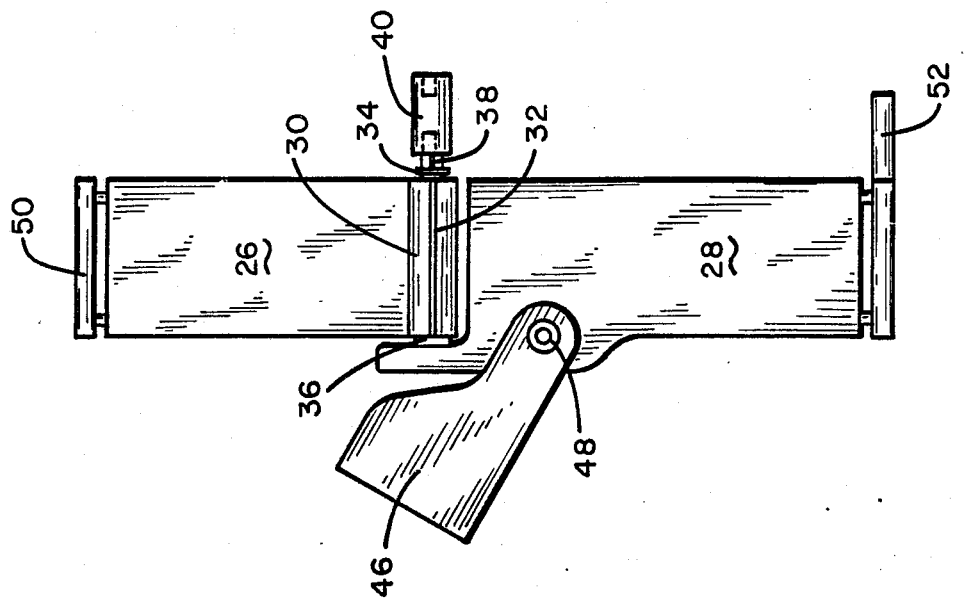
FIG. 2 is a top view of the jointer in accordance with the present invention.

As is further shown in FIG. 2, a guard member 46 is pivotally attached to the movable table segment by a bolt 48 which may be tightened to retain the guard in a covering position relative to the cutter blades when a board being cut is not being fed through the jointer. There is also attached to the opposed ends of the jointer tables cylindrical rods 50 and 52 on which a suitable edge fence may be attached. The edge fence, of course, provides a longitudinal rail against which the lumber may be guided as it is being fed through the cutter of the jointer.

Figure 3:
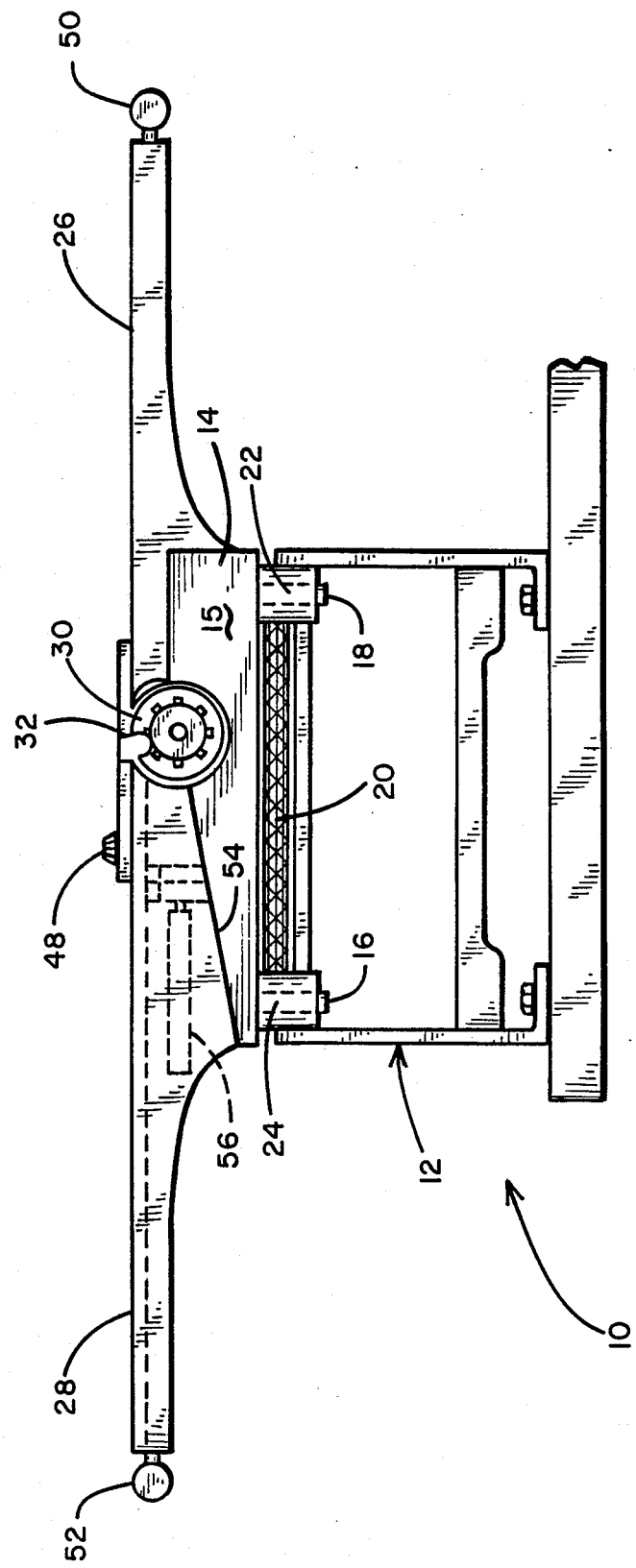
FIG. 3 is a side view of the jointer of the present invention.

With reference to FIG. 3, it is to be noted that the baseplate 14 has spaced-apart parallel side members is, each including a ramp surface 54 against which a corresponding ramp surface on the movable table 28 rests. The movable table 28 can be raised up or lowered relative to the fixed height of the cutter knife 32 and the top surface of the fixed table segment 26 by reaching under the movable table 28 and grasping a knurled rod 56 and rotating same. The threaded end of the knurled rod 56 fits into a block welded to the undersurface of the movable table and engages a bolt which passes through a slot formed in the ramp surface of the movable table 28. As such, rotation of the knurled grip rod 56 urges the movable table segment 28 up and down the ramp 54 to adjust the height of its upper surface relative to the cutter knife 32. It also maintains the height setting fixed or locked in place when the rod 56 is not being manually turned.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. In a multipurpose power tool of the type including an elongated bench having a first pedestal attached to said bench at one end thereof and a second pedestal attached to said bench at a location intermediate said one end and the opposed end thereof, a pair of spaced parallel elongated tubular ways pivotally secured at one end of each to said first pedestal for rotation between a horizontal disposition and a vertical disposition, a power head assembly including motor means disposed therein for driving a spindle assembly projecting from one end of said power head and including a power take-off shaft projecting from the opposite end of said power head, said power head being attached to said pair of tubular ways for axial movement therealong, a jointer attachment for said multipurpose power tool comprising:

(a) a base plate removably attached to said second pedestal, said base plate including a pair of parallel spaced-apart side members projecting vertically upward therefrom, said side members including a ramp surface over a predetermined portion thereof;

(b) a first table secured to said side members having an upper planar, horizontal surface of a given fixed elevation;

(c) a second table secured to said side members and cooperating with said ramp surface, said second table having an upper planar horizontal surface of an adjustable height relative to said fixed elevation;

(d) a roller having a splined drive shaft, said roller journaled for rotation between said pair of side members;

(e) a jointer cutting blade mounted on said roller and extending longitudinally thereacross the cutting edge of said blade being at the same elevation as said horizontal surface of said first table; and (f) means for coupling said roller to said power take-off shaft of said power head when said tubular ways are in said horizontal disposition.

2. The jointer as in claim 1 and further including means for sliding and locking said second table relative to said ramp surface on said pair of side plates.

3. The jointer as in claim 1 wherein said means for coupling comprises a tubular member having internal splines for mating with external splines on said power take-off shaft and said splined drive shaft.

4. The jointer as in claim 1 and further including a guard member pivotally attached to the upper surface of said second table for normally overlaying said roller and cutting blade except when a workpiece is being passed over said blade.

* * * * *